(12) United States Patent
Chang et al.

(10) Patent No.: US 8,377,350 B2
(45) Date of Patent: Feb. 19, 2013

(54) METHOD FOR CONTROLLING TEMPERATURES IN HOT RUNNERS OF MULTI-CAVITY INJECTION MOLD, METHOD FOR WARNING, AND CONTROL SYSTEM BASED ON THOSE METHODS

(75) Inventors: Jui-Wen Chang, Taoyuan County (TW); Chih-Hsiung Chung, Hualien County (TW); Shin-Hung Chen, Chiayi County (TW); Yi-Shu Hsu, Taichung (TW)

(73) Assignee: Precision Machinery Research Development Center, Taichung (TW)

( * ) Notice: Subject to any disclaimer, the term of this patent is extended or adjusted under 35 U.S.C. 154(b) by 107 days.

(21) Appl. No.: 13/017,934

(22) Filed: Jan. 31, 2011

(65) Prior Publication Data
US 2012/0193824 A1 Aug. 2, 2012

(51) Int. Cl.
*B29C 45/78* (2006.01)
(52) U.S. Cl. ...................... 264/40.6; 425/143
(58) Field of Classification Search ............ 264/40.6; 425/143, 144
See application file for complete search history.

(56) References Cited

U.S. PATENT DOCUMENTS

| | | | | | |
|---|---|---|---|---|---|
| 4,354,812 | A | * | 10/1982 | Wieder et al. | 425/144 |
| 4,798,692 | A | * | 1/1989 | Blersch et al. | 264/40.6 |
| 6,090,318 | A | * | 7/2000 | Bader et al. | 264/40.1 |
| 6,649,095 | B2 | * | 11/2003 | Buja | 264/40.6 |
| 7,507,359 | B2 | * | 3/2009 | Werfeli | 264/40.6 |
| 7,597,827 | B2 | * | 10/2009 | Frey | 264/40.6 |
| 7,651,644 | B2 | * | 1/2010 | Nahill et al. | 264/40.1 |
| 7,682,535 | B2 | * | 3/2010 | Frey | 264/40.6 |

\* cited by examiner

*Primary Examiner* — Jill Heitbrink
(74) *Attorney, Agent, or Firm* — Browdy and Neimark, P.L.L.C.

(57) ABSTRACT

A method for controlling temperatures in hot runners of a multi-cavity injection mold, a warning method, and a control system based on those methods are provided, in which a temperature sensor is positioned at the same location as each of the cavities of the mold, one of the cavities is chosen as a standard cavity, and a standard filling time is defined. Besides, in every injection cycle, a calculating and controlling module is to calculate the differences between the standard filling time and the filling times of the cavities, and according to the differences, the temperatures in the hot runners may be adjusted by a temperature-adjusting device and a warning device may be started. So, the volumetric filling of the cavities can be balanced very quickly, the process can avoid fluctuations of external environment so as to reduce the time for product development, and the quality of production can be maintained.

19 Claims, 2 Drawing Sheets

METHOD FOR CONTROLLING TEMPERATURES IN HOT RUNNERS OF MULTI-CAVITY INJECTION MOLD, METHOD FOR WARNING, AND CONTROL SYSTEM BASED ON THOSE METHODS

BACKGROUND OF THE INVENTION

1. Field of the Invention

The present invention relates generally to multi-cavity injection molding and more particularly, to a method for controlling temperatures in hot runners of a multi-cavity injection mold, a warning method for a multi-cavity injection mold, and a control system based on those methods.

2. Description of the Related Art

The industries of semiconductor, optoelectronics, and ICT (information and communication technology) develop so fast that the market demand for varied specifications of consumer electronics and optoelectronics, which are light, thin, high-precision, and exquisite, is increasing. Therefore, domestic and foreign injection molding factories think highly of multi-cavity injection molding which has the advantages of mass production within a short time and resultant cost savings. However, it is subject to the defects of short shot, warpage, and different weights of the products, which result from the filling of the multi-cavity injection mold is unbalanced, which means that the volumetric fillings of individual cavities of the multi-cavity injection mold are not uniform, so that the production has low yield rate and needs long time for development.

To resolve the above-mentioned problems, a conventional method for controlling temperatures in hot runners of a multi-cavity injection mold is first positioning a temperature sensor at the end of the filling path of each cavity to send a temperature signal to a temperature controller, and then adjusting the temperatures in the hot runners by the temperature controllers so as to balance the volumetric filling of the cavities. Furthermore, a foreign-developed controlling method is defining a standard filling time as the average of the maximum and minimum filling time of the cavities which are spent on filling up the cavities respectively, and adjusting the temperatures in the hot runners after each injection cycle to make the filling time of the cavities of the next cycle closer to the standard filling time of the present cycle. As a result, the aforesaid method can balance the volumetric filling of the cavities after several injection cycles.

However, in aforesaid method, before the volumetric filling of the cavities is balanced, a new average was worked out after every injection cycle, which means that the standard filling time is changed constantly and susceptible to fluctuations of external environment. Besides, products made in the balanced condition may not meet the quality requirements, so the process parameters should be further adjusted. As a result, the product development of multi-cavity injection molding based on the conventional method not only requires a very long time but fails to work out satisfactory products.

SUMMARY OF THE INVENTION

The present invention has been accomplished in view of the above-noted circumstances. It is an objective of the present invention to provide a method for controlling temperatures in hot runners of a multi-cavity injection mold and a control system based on the method, which can avoid fluctuations of external environment and balance the volumetric filling of the cavities very quickly so as to reduce the time of product development.

To attain the above objective, the present invention provides a method for controlling temperatures in hot runners of a multi-cavity injection mold which comprises steps of: (a) positioning a temperature sensor in the same location of each of several cavities of the multi-cavity injection mold; (b) choosing one of the cavities as a standard cavity and defining a standard filling time as time required from the beginning of injecting a material into the standard cavity till the material contacts the temperature sensor in the standard cavity; (c) injecting the material into the cavities through the hot runners which are connected with the cavities respectively, measuring time from the beginning of injection till the material contacts the temperature sensor in each cavity as a filling time of the cavity, and calculating the difference between the standard filling time and the filling time of each cavity as a temporal offset of the cavity; (d) if the temporal offset of at least one of the cavities is larger than a first preset value, adjusting the temperature in the hot runner which is connected with said cavity; and (e) repeating the steps (c) and (d) until the temporal offset of each cavity is smaller or equal to the first preset value.

Furthermore, the present invention provides a control system based on the aforesaid method for controlling temperatures in hot runners of a multi-cavity injection mold. The control system comprises several temperature sensors positioned in several cavities of the multi-cavity injection mold respectively for generating a temperature signal each; a calculating and controlling module for receiving the temperature signals generated by the temperature sensors and calculating temporal offsets of the cavities; and a temperature-adjusting device controlled by the calculating and controlling module for adjusting temperatures in the hot runners which are connected with the cavities respectively.

As a result, the aforesaid control system and method can be applied in the development stage of a product, avoid fluctuations of the external environment, and balance the volumetric filling of the cavities very quickly. Besides, the temperature parameters of the hot runners worked out in the method can be used in the subsequent production of the same product, and the products from each cavity can meet the quality requirements so that the product can proceed to the production stage. In other words, the control system and the method can efficiently reduce the time of product development.

It is another objective of the present invention to provide a warning method for a multi-cavity injection mold and a control system based on the warning method, which can supervise the quality of the products.

To attain the above objective, the present invention provides a warning method for a multi-cavity injection mold, which comprises steps of: (a) positioning a temperature sensor in the same location of each of several cavities of the multi-cavity injection mold; (b) choosing one of the cavities as a standard cavity and defining a standard filling time as time required from the beginning of injecting a material into the standard cavity till the material contacts the temperature sensor in the standard cavity; (c) injecting the material into the cavities through the hot runners which are connected with the cavities respectively, measuring time from the beginning of injection till the material contacts the temperature sensor in each cavity as a filling time of the cavity, and calculating the difference between the standard filling time and the filling time of each cavity as a temporal offset of the cavity; and (d) repeating the step (c) several times, and then starting a warning device if the temporal offsets of at least one of the cavities worked out in a plurality of continuous times of the step (c) are larger than a second preset value.

Furthermore, the present invention provides a control system based on aforesaid warning method, which comprises several temperature sensors positioned in several cavities of the multi-cavity injection mold respectively for generating respective temperature signals; a calculating and controlling module for receiving the temperature signals generated by the temperature sensors and calculating temporal offsets of the cavities; and a warning device controlled for activation by the calculating and controlling module.

In light of the above, the aforesaid control system and warning method can be applied to the production stage of products. In the continuous production process, the activated warning device can alert the engineers that something is wrong with the products, thus supervising the quality of the products.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
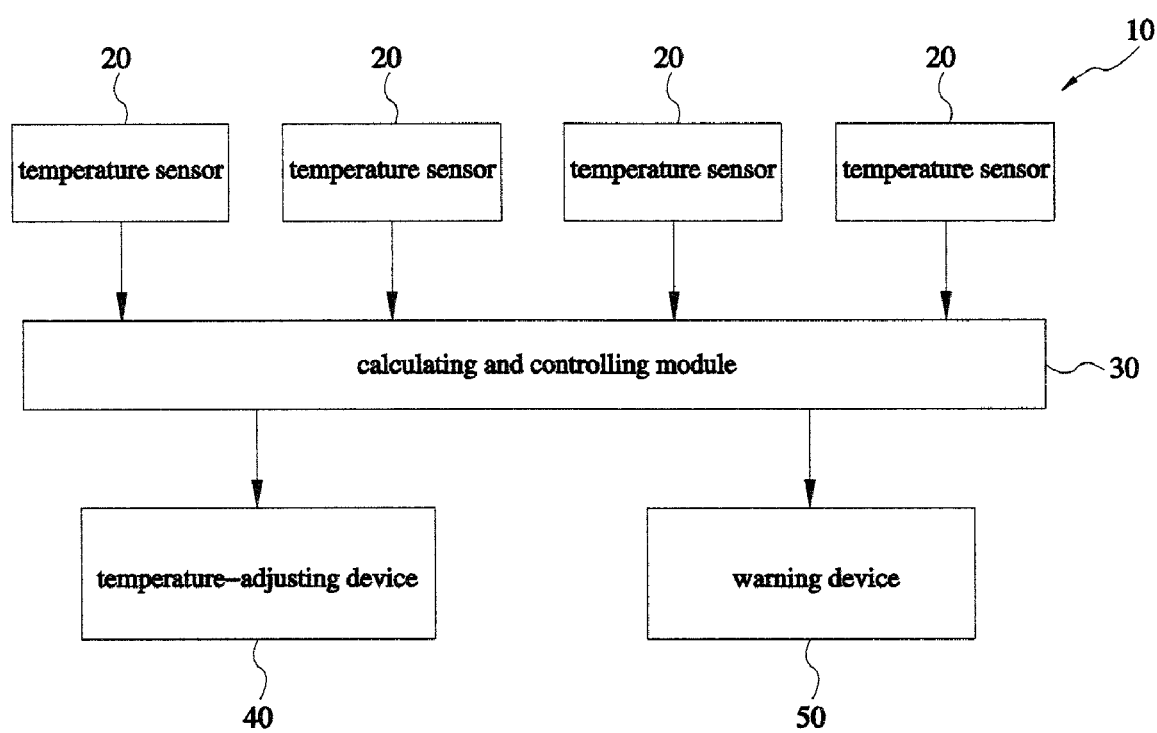
FIG. 1 is a schematic drawing of a control system according to a preferred embodiment of the present invention.

As shown in FIG. 1, a control system 10 in accordance with a preferred embodiment of the present invention includes several temperature sensors 20, a calculating and controlling module 30, a temperature-adjusting device 40, and a warning device 50.

The control system 10 is installed into several cavities (not shown) of the same shapes and into several hot runners (not shown) connected with the cavities respectively. In the molding process, a molten material is injected into the cavities through the hot runners respectively, and then the products of the same shape are formed in the cavities respectively.

In the embodiment, a mold with four cavities is instanced, and the temperature sensors 20 are positioned at the same locations of the cavities respectively, which means that the control system 10 has four temperature sensors 20. It is preferable to position each temperature sensor 20 in the final part, especially where the filling path of the cavity reaches 95-98%, so that the temperature sensors 20 can sense a sudden rise in temperature when contacting the molten material so as to indicate that the cavity is almost full.

The calculating and controlling module 30 can receive the temperature signals generated by the temperature sensors 20 and calculate the time intervals between the beginning of injection and when the temperature sensors 20 senses a sudden rise in temperature respectively, i.e. when the temperature sensors 20 contacts the molten material. Then, the filling time for each of the cavities is inferable based on the time interval. Besides, the calculating and controlling module 30 can control the temperature-adjusting device 40 for adjusting the temperatures in the hot runners. The warning device 50 is also controlled by the calculating and controlling module 30 to emit lights, sounds or other signals to call attention, or to stop the operation of the production equipment.

Figure 2:
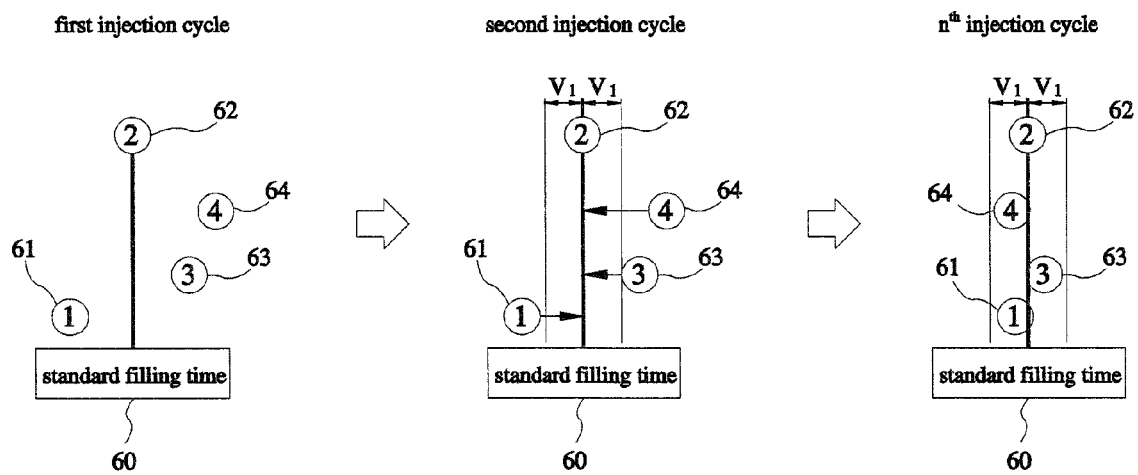
FIG. 2 is a flow chart of a method for controlling temperatures in hot runners of a multi-cavity injection mold according to the preferred embodiment of the present invention.

The aforesaid control system 10 can take a method for controlling temperatures in hot runners of a multi-cavity injection mold to be applied to the product process development. The method is shown in FIG. 2 and includes the steps described below:

(a) Position a temperature sensor 20 in the same location of each of multiple cavities of the multi-cavity injection mold. In the embodiment, the mold has four cavities.

(b) Choose one of the cavities as a standard cavity and define a standard filling time 60 as a time interval between the beginning of injecting a material into the standard cavity and when the material contacts the temperature sensor 20 in the standard cavity. The standard cavity and the standard filling time 60 can be defined through simulation and experiment, numerical methods based on the properties of plastics, or another customized way. In the embodiment, the cavity No. 2 is taken as the standard cavity, so the standard filling time 60 is the time required for filling the cavity No. 2.

(c) Inject the material into the cavities through the hot runners which are connected with the cavities respectively, measure the time from the beginning of injection till the material contacts the temperature sensors 20 in the cavities Nos. 1-4 and define it as a filling time 61, 62, 63, or 64 of the cavity respectively, and then calculate the difference between the standard filling time 60 and each filling time 61, 62, 63, or 64 as a temporal offset of the cavity respectively.

(d) If the temporal offset of at least one of the cavities is larger than a first preset value V1, adjust the temperature in the hot runner connected with said cavity whose temporal offset is too large via the temperature-adjusting device 40. The first preset value V1 can be set as any acceptable tolerance, or as the tolerance calculated from three sigma (standard deviation) rule, which is commonly applied to quality control, taking the standard deviation of the filling time 61, 62, 63, or 64 calculated by taking the standard filling time 60 as the mean value. The purpose of adjusting the temperature in the hot runner by the temperature-adjusting device 40 is to make the filling time of the cavity in the next injection cycle closer to the standard filling time 60. The temperature-adjusting device 40 is controlled by the calculating and controlling module 30 which is based on, but not limited to, the fuzzy control method.

(e) Repeat the steps (c) and (d) until the temporal offset of each cavity is smaller or equal to the first preset value V1.

In this way, the volumetric filling of the cavities is balanced and thus the products from the cavities are uniform and satisfactory. Because the standard filling time 60 is a constant in the whole process, the method can be excused from the fluctuations of the external environment so that the temperature parameters of the hot runners worked out in the method can be applied to many production lines to make the same products by means of the same molds. In other words, the product can proceed to the production stage.

The control system 10 can be further applied to the production stage for supervising the quality of the products by taking a warning method. The warning method is firstly to repeat the aforesaid step (c) several times, which means repeating injection cycle and in every injection cycle measuring the temperatures in the cavities by the temperature sensors 20 and calculating the temporal offsets of the cavities. Then, if the temporal offsets of the same one of the cavities worked out in a plurality of continuous times of the step (c) are larger than a second preset value, activate the warning device 50 by the calculating and controlling module 30 to emit warning signals to remind the engineers to do necessary check and adjustment.

In aforesaid warning method, the second preset value can be an acceptable tolerance identical to or different from the first preset value V1, or be the tolerance calculated in accordance with the three sigma rule. The activated warning device 50 can inform the engineers that something is wrong with the production line. It is possible that the problem occurred in the standard cavity, and in that event, adjusting the hot runner connected with the standard cavity by the temperature-adjusting device 40 can restore the production line to make satisfactory products.

Furthermore, the control system 10 can be applied to inspect if the temperature of the material in the cavities is out of a temperature range which can be set as the molding temperature range of the material. Specifically speaking, the warning device 50 can be set to start if the temperature sensor 20 in the same one of the cavities sense temperature out of the temperature range in a plurality of continuous times of the step (c).

In addition to aforesaid warning method for single cavity, the present invention also provides a warning method for multiple cavities, which is described below.

The warning device 50 can be set to start if the temporal offsets of an amount of the cavities worked out in a plurality of continuous times of the step (c) are larger than the second preset value to inform the engineers that several cavities have problems. Then, the temperatures in the hot runners can be all readjusted. The amount mentioned before can be set as an acceptable number, and in the embodiment, it is set as one third of the total amount of the cavities.

Besides, the warning device 50 also can be set to start if at least one third of the temperature sensors sense that the temperature rises beyond the molding temperature range of the material in a plurality of continuous times of the step (c). Then, the temperature in the hot runner connected with the standard cavity can be readjusted, or, the temperatures in the hot runners can be all readjusted.

In aforesaid warning methods for single cavity and multiple cavities, it is preferable to start the warning device 50 after said unusual situation occurred in three continuous times of the step (c). However, the number of times can be plural, not limited to three.

The aforesaid control system 10 and method for controlling temperatures can not only reduce the time of development of a multi-cavity injection molding product, but also maintain the quality of production. It can be learned from the above description that in the product development stage, the control system 10 can include none of the warning device 50. Besides, in the production stage, the control system 10 can include none of the temperature-adjusting device 40. In that event, the control system 10 can take another warning method which neither includes the aforesaid the steps (d) and (e), in which the temperatures in the hot runners may be adjusted, nor the process of adjusting the temperatures in the hot runners after unusual situation occurred, either. In other words, the warning method only function as warning the engineers of unusual situations in need of proper treatment so as to recover the quality of the subsequent products.

It is emphasized here that the control system 10 provided in the present invention centers on sensing the temperatures in the multiple cavities and the calculation. So, the control system 10 mainly includes the temperature sensors 20 and the calculating and controlling module 30. If adjusting the temperatures in the hot runners is needed, the temperature-adjusting device 40 can be included into the control system 10. If supervising the quality of the products by emitting warning signals is needed, the warning device 50 can be included into the control system 10. Therefore, the control system 10 can be variously embodied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling temperatures in hot runners of a multi-cavity injection mold comprising steps of:
   (a) positioning a temperature sensor in the same location of each of several cavities of the multi-cavity injection mold;
   (b) choosing one of the cavities as a standard cavity and defining a standard filling time as a time interval between the beginning of injecting a material into the standard cavity and when the material contacts the temperature sensor in the standard cavity;
   (c) injecting the material into the cavities through the hot runners connected with the cavities respectively, measuring time from the beginning of injection till the material contacts the temperature sensor in each cavity as a filling time of the cavity, and calculating the difference between the standard filling time and the filling time of each cavity as a temporal offset of the cavity;
   (d) if the temporal offset of at least one of the cavities is larger than a first preset value, adjusting the temperature in the hot runner which is connected with said cavity; and
   (e) repeating step (c) to step (d) until the temporal offset of each cavity is smaller or equal to the first preset value.

2. The method as claimed in claim 1 further comprising a step of:
   (f) repeating step (c) several times and starting a warning device if the temporal offsets of one of the cavities worked out in a plurality of continuous times of step (c) are larger than a second preset value.

3. The method as claimed in claim 1 further comprising a step of:
   (f) repeating the step (c) several times and starting a warning device if the same temperature sensor senses that the temperature rises beyond a range after a plurality of continuous times of the step (c).

4. The method as claimed in claim 1 further comprising a step of:
   (f) repeating the step (c) several times and starting a warning device if the temporal offsets of at least one third of the cavities worked out after a plurality of continuous times of the step (c) are larger than a second preset value.

5. The method as claimed in claim 1 further comprising a step of:
   (f) repeating the step (c) several times and starting a warning device if the temperature sensors in at least one third of the cavities sense that the temperature rise beyond a range after a plurality of continuous times of the step (c).

6. The method as claimed in claim 2, wherein the warning device is started when the said abnormity occurs for three times.

7. The method as claimed in claim 1, wherein in the step (a), the temperature sensors are positioned at final parts of filling paths of the cavities respectively.

8. The method as claimed in claim 7, wherein the temperature sensors are positioned where the filling paths of the cavities reach 95-98% respectively.

9. A control system based on the method claimed in claim 1, comprising:
   a plurality of temperature sensors positioned in the cavities of the multi-cavity injection mold respectively for generating temperature signals;
   a calculating and controlling module for receiving the temperature signals generated by the temperature sensors and calculating temporal offsets of the cavities; and
   a temperature-adjusting device controlled by the calculating and controlling module for adjusting temperatures in the hot runners connected with the cavities respectively.

10. The control system as claimed in claim 9, further comprising a warning device which is controlled by the calculating and controlling module.

11. A warning method for a multi-cavity injection mold comprising steps of:
   (a) positioning a temperature sensor in the same location of each cavity of the multi-cavity injection mold;
   (b) choosing one of the cavities as a standard cavity and defining a standard filling time as the time required from the beginning of injecting a material into the standard cavity till the material contacts the temperature sensor in the standard cavity;
   (c) injecting the material into the cavities through the hot runners connected with the cavities respectively, measuring the time from the beginning of injection till the material contacts the temperature sensor in each cavity as a filling time of the cavity, and then calculating the difference between the standard filling time and the filling time of each cavity as a temporal offset of the cavity; and
   (d) repeating the step (c) several times, and starting a warning device if the temporal offset of at least one of the cavities worked out in a plurality of continuous times of the step (c) are larger than a second preset value.

12. The warning method for a multi-cavity injection mold as claimed in claim 11, wherein in the step (d), the warning device is started if the temporal offsets of at least one third of the cavities worked out in a plurality of continuous times of the step (c) are larger than the second preset value.

13. A control system based on the warning method claimed in claim 11, comprising:
   a plurality of temperature sensors positioned in the cavities of the multi-cavity injection mold respectively for generating temperature signals;
   a calculating and controlling module for receiving the temperature signals generated by the temperature sensors and calculating temporal offsets of the cavities; and
   a warning device controlled by the calculating and controlling module.

14. The warning method as claimed in claim 11, wherein the warning device is started if said abnormity occurs for three times.

15. The warning method as claimed in claim 11, wherein in the step (a), the temperature sensors are positioned at final parts of filling paths of the cavities respectively.

16. The warning method for a multi-cavity injection mold as claimed in claim 15, wherein the temperature sensors are positioned where the filling paths of the cavities reach 95-98% respectively.

17. A warning method for a multi-cavity injection mold, comprising steps of:
   (a) positioning a temperature sensor in the same location of each cavity of the multi-cavity injection mold, and choosing one of the cavities as a standard cavity and defining a standard filling time as the time required from the beginning of injecting a material into the standard cavity till the material contacts the temperature sensor in the standard cavity;
   (b) injecting a material into the cavities through hot runners connected with the cavities respectively, measuring time from the beginning of injection till the material contacts the temperature sensor in each cavity as a filling time of the cavity; and
   (c) repeating the step (b) several times and starting a warning device if at least one of the temperature sensors senses that the temperature rises beyond a range after a plurality of continuous times of the step (b), if the temporal offset of at least one of the cavities is larger than a first preset value, adjusting the temperature in the hot runner which is connected with said cavity.

18. The warning method as claimed in claim 17, wherein in the step (c), the warning device is started if at least one third of the temperature sensors sense that the temperatures rise beyond the range after a plurality of continuous times of the step (b).

19. A control system based on the warning method claimed in claim 17, comprising:
   a plurality of temperature sensors positioned in the cavities of the multi-cavity injection mold respectively for generating temperature signals;
   a calculating and controlling module for receiving the temperature signals generated by the temperature sensors; and
   a warning device controlled by the calculating and controlling module.

* * * * *